United States Patent [19]
Bronner

[11] Patent Number: 5,873,046
[45] Date of Patent: Feb. 16, 1999

[54] SYSTEM FOR COMMUNICATING IN ANALOG OR DIGITAL MODE AND MOBILE STATION EMPLOYING THE SAME

[75] Inventor: Peter E. Bronner, Mohnton, Pa.

[73] Assignee: Lucent Technologies Inc., Murray Hill, N.J.

[21] Appl. No.: 762,008

[22] Filed: Dec. 11, 1996

[51] Int. Cl.$^6$ .................................................. H04B 1/16
[52] U.S. Cl. .................... 455/553; 455/226.2; 455/234.1
[58] Field of Search .................................. 455/552, 553, 455/575, 127, 232.1, 234.1, 226.2, 226.3

[56] References Cited

U.S. PATENT DOCUMENTS

| | | | |
|---|---|---|---|
| 4,247,949 | 1/1981 | Watanabe et al. | 455/226.2 |
| 5,042,082 | 8/1991 | Dahlin | 455/553 |
| 5,390,365 | 2/1995 | Enok et al. | 455/226.2 |
| 5,603,113 | 2/1997 | Deloe, Jr. | 455/234.1 |
| 5,693,081 | 12/1997 | Cyall, Jr. et al. | 455/234.1 |

*Primary Examiner*—Edward F. Urban

[57] ABSTRACT

For use in a system capable of communicating in either analog or digital wireless infrastructures, an intermediate frequency ("IF") amplifier and method that allows the system to process both analog and digital input signals in a common amplifier stage. The system includes: (1) first and second amplifiers, having parallel-coupled signal inputs and gains that combine to equal a constant total value, that receive an input signal and produce therefrom first and second output signals that are each a function of an applied gain signal, (2) a combinatorial circuit, coupled to the first and second amplifiers, that derives from the first and second output signals a combined signal that is a function of a power of the input signal and substantially immune to changes in the applied gain signal and (3) a gain control circuit, coupled to the first and second amplifiers, that holds the gain signal constant when the input signal is analog and varies the gain signal when the input signal is digital.

20 Claims, 3 Drawing Sheets

FIG. 1 *PRIOR ART*

SYSTEM FOR COMMUNICATING IN ANALOG OR DIGITAL MODE AND MOBILE STATION EMPLOYING THE SAME

TECHNICAL FIELD OF THE INVENTION

The present invention is directed, in general, to wireless communications and, more specifically, to an intermediate frequency ("IF") amplifier architecture having a common amplifier stage for amplifying both analog and digital signals and a mobile station employing the same.

BACKGROUND OF THE INVENTION

The use of wireless telecommunications has undergone substantial growth in the past decade and is projected to continue expanding as service improves and new products and features are offered. In recent years, certain standards adopted by the communication industry provide the capability for increased user capacity and improved privacy by adding digital speech synthesis capability to mobile stations and basestations. Until all wireless telecommunications networks implement the capability to provide digital transmission, however, mobile stations must have circuitry capable of receiving and processing both conventional analog, as well as digital, signals.

Conventional analog wireless communications are based on frequency modulation ("FM") of the radio channel. As will be explained in more detail hereinafter, signal amplifier circuits within analog radio receivers are typically operated in a "limiting," or "saturated," condition. In contrast, several of the industry standards for digital receivers require that the signal amplifiers be operated in a linear (i.e. "non-saturated") mode under most circumstances. Thus, conventional mobile stations capable of operating in both digital and analog modes use a dual-mode intermediate-frequency ("IF") receiver having separate and independent amplifier chains for each mode; i.e. an analog mode IF amplifier chain and a digital mode IF amplifier chain.

Many wireless telecommunications standards mandate that mobile stations provide a received signal strength indication ("RSSI"). The RSSI information is used by the wireless telecommunications system to set transmitter power levels, assign frequency channels, and assign mobile units to base stations. Conventional dual-mode receivers derive the RSSI signal from the analog mode IF amplifier chain when operating in analog mode. When operating in digital mode, the RSSI signal is typically derived by quantization of the baseband waveform demodulated from the output of an automatic-gain-control ("AGC") amplifier that is used to control the gain of the digital-mode IF amplifier chain. Although the RSSI signal derived from the analog mode IF amplifier chain could be used in digital mode, it would be necessary to provide power to both the digital and analog mode IF amplifier chains during digital mode operation, which would approximately double the amount of power required to operate the IF amplifier section of the receiver. On the other hand, deriving the RSSI signal by quantization of the baseband waveform demodulated from the output of the digital-mode AGC amplifier requires additional baseband processing circuitry.

From the foregoing, it is easy to recognize that the coexistence of separate and independent analog and digital mode IF amplifier chains has several disadvantages. First, according to conventional designs, providing both analog and digital modes of operation requires the use of separate and independent analog and digital mode IF amplifier chains. Thus, much more circuitry is required, which may increase the size and weight of the mobile station. Furthermore, if it is desired that the circuitry be implemented in an integrated circuit, the cost of the mobile station may be increased. This is because, in the semiconductor industry, there is a cost associated with the size (area) of the silicon die, or "chip," on which an integrated circuit is fabricated. A characteristic of the defect probability associated with fabricating semiconductor wafers is that the cost increases as a substantially exponential function of the die size. Therefore, there is an incentive to minimize the die area, which can only be accomplished by reducing the amount of circuitry. Secondly, and of particular importance, mobile stations are typically powered by batteries, and thus it is desirable to minimize power consumption to thereby extend the operating time of the mobile station. Consequently, there is a further incentive to improve the power efficiency of the mobile station by eliminating circuitry.

Therefore, what is needed in the art is a way of integrating the functions of the conventional dual IF-amplifier chains into a single "dual-mode" amplifier chain capable of operating in both digital and analog modes.

SUMMARY OF THE INVENTION

To address the above-discussed deficiencies of the prior art, the present invention provides, for use in a mobile station capable of communicating in either analog or digital wireless infrastructures, an IF amplification system and method that allows the mobile station to process both analog and digital input signals in a common amplifier stage. The system includes: (1) first and second amplifiers, having parallel-coupled signal inputs and gains that combine to equal a constant total value, that receive an input signal and produce therefrom first and second output signals that are each a function of an applied gain signal, (2) a combinatorial circuit, coupled to the first and second amplifiers, that derives from the first and second output signals a combined signal that is a function of a power of the input signal and substantially immune to changes in the applied gain signal and (3) a gain control circuit, coupled to the first and second amplifiers, that holds the gain signal constant when the input signal is analog and varies the gain signal when the input signal is digital.

The present invention therefore introduces an IF amplifier architecture that, for the first time, allows a single amplifier chain to process either analog or digital input signals and allows an accurate RSSI to be derived regardless of the type of signal being processed.

As used herein, "analog" is used to refer to modulation schemes, or wireless communications networks employing modulation schemes, which do not require the preservation of the characteristics of a transmitted signal's amplitude envelope, such as frequency modulation (FM), whereby limiting/non-linear amplifiers may be employed. Also, "digital" is used to refer to modulation schemes, or wireless communications networks employing modulation schemes, which require the preservation of the characteristics of a transmitted signal's amplitude envelope, whereby linear, or automatic-gain-control ("AGC"), amplifiers may be employed.

In one embodiment of the present invention, the system further comprises a constant current circuit, coupled to the first and second amplifiers, that maintains a constant total current flow through the first and second amplifiers, a change in current flow through the first amplifier causing a counteracting change in current flow through the second amplifier thereby to cause the gains to combine to equal a constant total value. The constant current circuit ensures that an increase in the gain of one amplifier is offset by a decrease in the gain of the other. This "balances" the two amplifiers with respect to total gain, rendering their combined output independent of the applied gain signal.

In one embodiment of the present invention, the input signal is a differential signal and each of the first and second amplifiers comprises differentially-coupled, matched transistors. Those skilled in the art are aware, however, that other amplifier topologies may prove useful, depending upon the application.

In one embodiment of the present invention, the combinatorial circuit sums the first and second output signals to derive the combined signal. Other applications may call for a different type of combination, however. The present invention is not limited to a particular type of combination, such as summing.

In one embodiment of the present invention, the system further comprises a rectifier, coupled to an output of the combinatorial circuit, that receives and rectifies the combined signal to produce therefrom an RSSI. Those skilled in the art are familiar with how RSSI is determined in prior art circuits. The present invention, however, allows RSSI to be determined when a digital input signal is being processed (and gain in the amplifiers is varied).

In one embodiment of the present invention, the system further comprises a plurality of series-coupled amplifier stages, each of the plurality of amplifier stages comprising first and second amplifiers and a combinatorial circuit, combined signals derived by combinatorial circuits of each of the plurality of amplifier stages being rectified and summed to produce an RSSI. The principles of the present invention are in no way limited to a specific number of amplifier stages. Furthermore, filters may or may not be interposed into the chain of series-coupled amplifier stages.

In one embodiment of the present invention, the system further comprises a constant current circuit, coupled to the first and second amplifiers and comprising differentially-coupled transistors, that receives the applied gain signal and a reference signal and controls a total current passing through the first and second amplifiers thereby to cause the gains to combine to equal the constant total value. In the embodiment to be illustrated and described, the differentially-coupled transistors allow the current passing through the first and second amplifiers to be controlled accurately.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
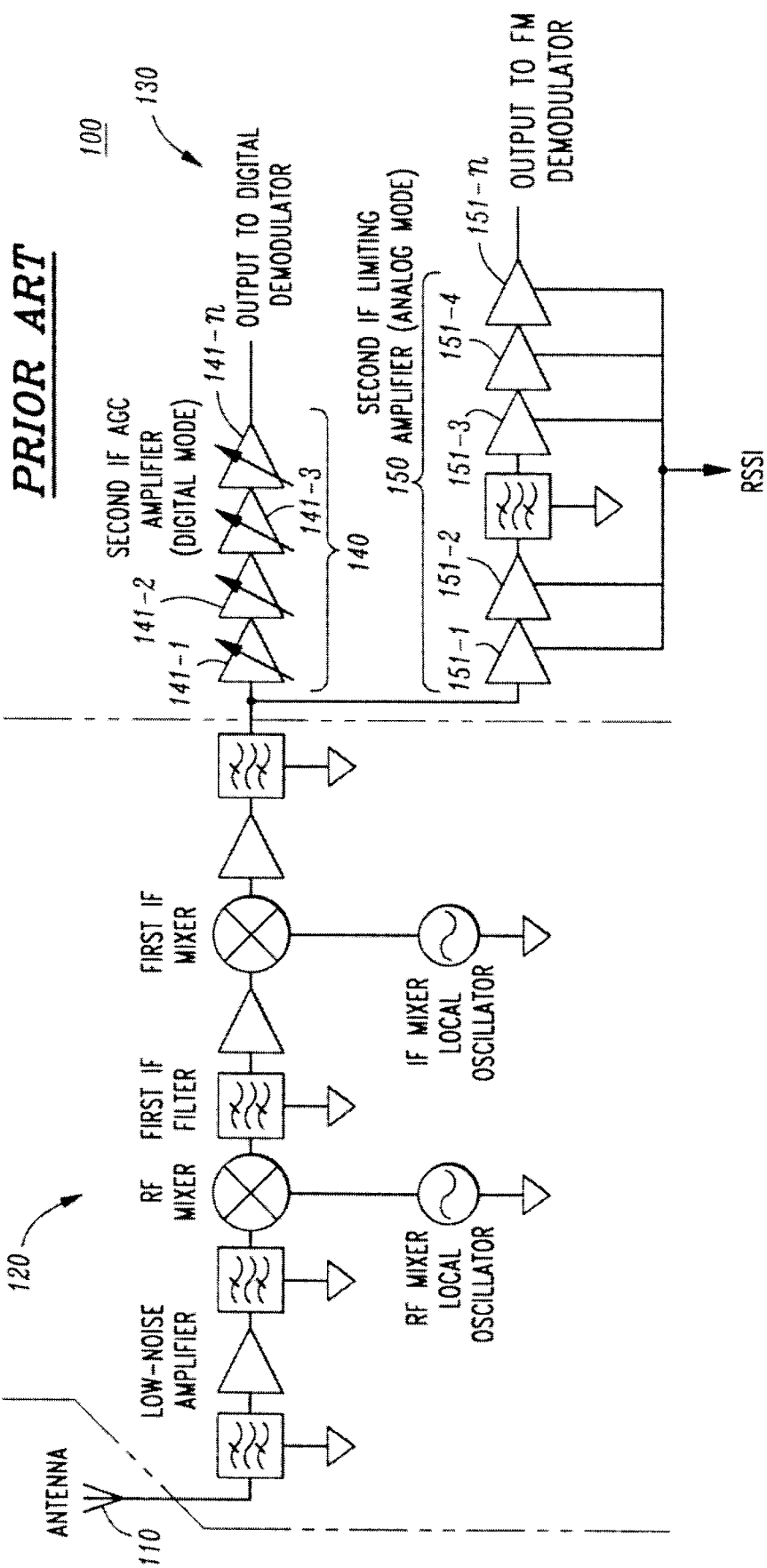
FIG. 1 illustrates a functional partial-schematic of a prior art dual-mode mobile station receiver employing separate analog and digital IF amplifier chains.

Referring initially to FIG. 1, illustrated is a functional partial-schematic of a prior art dual-mode mobile-station receiver 100 that includes an intermediate-frequency ("IF") amplifier section 130 having separate digital and analog IF amplifier chains 140, 150. The receiver 100 includes an antenna 110, antenna interface circuitry 120, and an intermediate-frequency ("IF") amplifier section 130. Those skilled in the art will recognize that the antenna interface circuitry, generally designated 120, is conventional in design and may include, without limitation, preselector/duplex filters, a low-noise amplifier, a radio-frequency ("RF") mixer, a first IF filter and a first IF mixer. The principles of the present invention are not limited to a particular antenna interface architecture. Intermediate-frequency ("IF") amplifier section 130 includes a digital-mode IF amplifier 140 and an analog-mode IF amplifier 150; the operation of each IF amplifier is independent of the other.

Digital-mode IF amplifier 140 typically consists of a chain of series-coupled amplifier stages 141; the number of stages, n, varying from device to device. Digital-mode IF amplifier 140 is designed to operate as a "linear" amplifier over a wide range of input signal levels; i.e. the IF amplifier 140 is preferably designed such that none of the amplifier stages 141 goes into saturation due to a large input signal, thus preserving the amplitude variations of the input signal waveform while providing high gain and high fidelity. Those skilled in the art, however, will recognize that the preferred range of input signals is a function of the particular implementation, including demodulator specifications, and that some implementations may accommodate large input signals which may drive one or more of the amplifier stages 141 into saturation.

Whereas the input signal amplitude may vary over several orders of magnitude, and a practical linear amplifier has a finite saturation point at its output, the overall gain of IF amplifier 140 is made variable in order to maintain a constant output amplitude at a level somewhat below the amplifier saturation point. To effect variable gain control, a negative feedback loop (not shown) is provided. The negative feedback is typically generated by comparing the amplifier 140 output signal to an ideal (non-limiting) output level to create an inverse error signal which is then appropriately scaled to drive a circuit which modifies the amplifier gain.

Similarly, analog-mode IF amplifier 150 typically consists of a chain of series-coupled amplifier stages 151; the number of stages, n, varying from device to device. The analog-mode IF amplifier 150 is typically designed to be a "limiting" amplifier, meaning that it is expected to be driven to "saturation" by the input signal such that the output waveform is essentially rectangular, having lost all amplitude modulation present in the input signal waveform.

A conventional analog-mode IF amplifier 150 also provides a received-signal-strength-indication ("RSSI") output. In a conventional analog-mode "limiting" amplifier, the gain of each stage 151 is fixed at its maximum level. A portion of the AC output of each stage 151 is sampled and passed through a full-wave rectifier ("FWR") circuit (not shown). The FWRs of each stage 151 each produce a current scaled to the logarithm (log) of the root-mean-square ("rms") voltage of the signal received at the input to each respective stage 151; the maximum FWR current being proportional to the log of the maximum output of the particular stage when saturated. Thus, the current from all the FWRs can be summed to provide a total current that is proportional to a wide range of input signal strengths, typically on the order of >90 dB.

Figure 2:
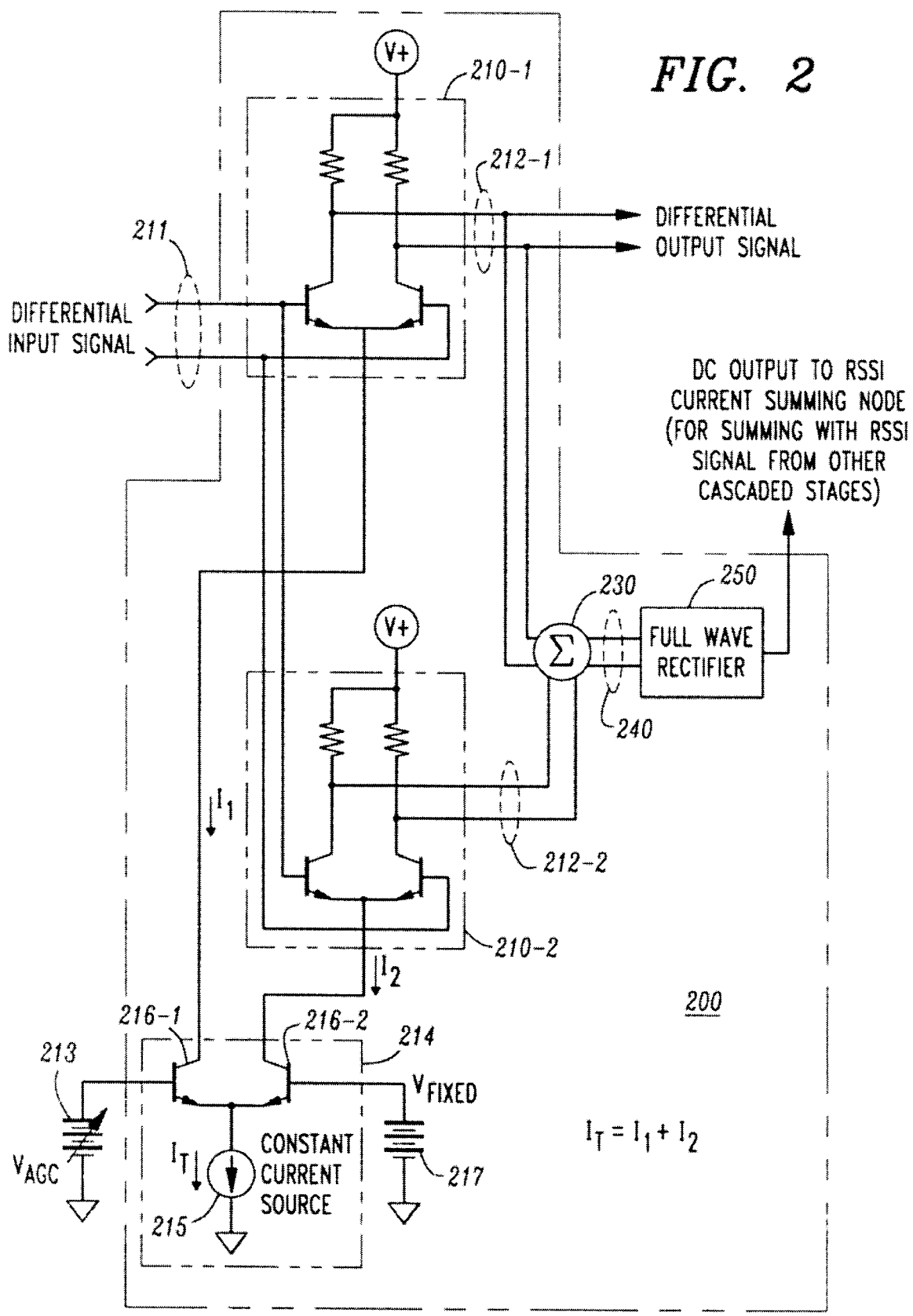
FIG. 2 illustrates a preferred embodiment of an integrated dual-mode IF amplifier stage that employs the principles of the present invention.

Turning now to FIG. 2, illustrated is a preferred embodiment of an integrated dual-mode IF amplifier stage 200 that employs the principles of the present invention. The IF amplifier stage 200 includes first and second differential amplifiers 210-1, 210-2 that have parallel-coupled signal inputs that receive the differential input signal 211 and produce therefrom first and second output signals 212-1, 212-2 that are a function of the gain of each respective amplifier 210-1, 210-2. Those skilled in the art will recognize that the principles of the present invention may also be employed in circuits using single-ended (ground-referenced) input signals. As described infra, the gains of amplifiers 210-1, 210-2 vary in a mutually inverse manner such that the combined signal 240 is constant for a given amplitude of differential input signal 211 and is independent of the instantaneous gain of each amplifier 210-1, 210-2.

In a preferred embodiment, IF amplifier stage 200 further includes a constant-current circuit 214 that is coupled to the first and second differential amplifiers 210-1, 210-2. The constant current circuit 214 includes a constant current source 215, which produces a current "$I_T$" and differentially-coupled transistors 216-1, 216-2. The gain of the dual-mode IF amplifier stage 200 is controlled by a gain control circuit (illustrated in and described infra with reference to FIG. 3) that produces an automatic-gain-control signal ("$V_{AGC}$") 213. The automatic-gain-control signal 213 is coupled to transistor 216-1 and a fixed reference voltage ("$V_{FIXED}$") is coupled to transistor 216-2.

Those of skill in the art will recognize that the automatic-gain-control signal ("$V_{AGC}$") 213 can be used to control the bias currents $I_1$ and $I_2$ of the first and second differential amplifiers 210-1, 210-2, respectively, such that the sum of the currents $I_1$ and $I_2$ is always equal to $I_T$) and thus the sum of the gains of the differential amplifiers 216-1, 216-2 will equal a constant total value. The gain control circuit holds the automatic-gain-control signal ("$V_{AGC}$") 213 constant when the receiver is operating in analog mode and varies the automatic-gain-control signal ("$V_{AGC}$") 213 when the receiver is operating in digital mode. The fixed reference voltage ("$V_{FIXED}$") 217 is preferably chosen such that when the IF amplifier stage 200 is operated as a linear amplifier, corresponding to the digital mode of operation, the range of the automatic-gain-control signal ("$V_{AGC}$") 213 satisfies the relationship:

$$V_{AGC(min)} < V_{FIXED} < V_{AGC(max)}.$$

To operate the IF amplifier stage 200 as a limiting amplifier, corresponding to the analog mode of operation, the automatic-gain-control signal ("$V_{AGC}$") 213 is maintained at a level sufficient to provide maximum gain.

As noted supra, many wireless telecommunications standards mandate that mobile stations provide a received signal strength indication ("RSSI"). Conventional dual-mode mobile receivers have heretofore provided an RSSI indication, in both analog and digital modes, only at the expense of additional power dissipation or additional circuitry. To provide a RSSI in both analog and digital modes, while reducing both power dissipation and circuitry, the IF amplifier stage 200 includes a combinatorial circuit 230 that is coupled to the outputs of the first and second differential amplifiers 210-1, 210-2 and receives therefrom output signals 212-1, 212-2, respectively. In a preferred embodiment, the combinatorial circuit 230 sums the first and second output signals 212-1, 212-2 to produce a combined signal 240. Whereas each of the differential amplifiers 210-1, 210-2 receives the same input signal, and the sum of the gains of the amplifiers 210-1, 210-2 equals a constant total value, then the combined signal 240 must be proportional to the differential input signal 211. Those skilled in the art will note that the combined signal 240 only varies as a function of the differential input signal 211; i.e. the combined signal 240 is not a function of the amplifier gain, which makes it suitable for use as an RSSI regardless of whether the amplifier stage 200 is operating as a linear (digital mode) amplifier or a limiting (analog mode) amplifier. In an IF amplifier design including multiple amplifier stages 200, the combined signals from each stage may be summed to produce a received-signal-strength-indicator ("RSSI") Furthermore, the combined signal 240 is substantially immune to changes in the applied automatic-gain-control signal ("$V_{AGC}$") 213, which makes the design particularly suited to application in dual-mode IF amplifiers.

In one embodiment, the amplifier stage 200 may further include a full-wave rectifier ("FWR") 250, coupled to the output of the combinatorial circuit 230, that receives and rectifies the combined signal 240 to produce therefrom a received signal strength indicator (RSSI). In an IF amplifier employing a plurality of amplifier stages 200 (described infra), the FWRs of each stage 200 each produce a signal scaled to the differential input signal 211 received at the input to each respective amplifier stage 200; the sum of the RSSI signals from each stage being proportional to the received signal strength at antenna 110.

Figure 3:
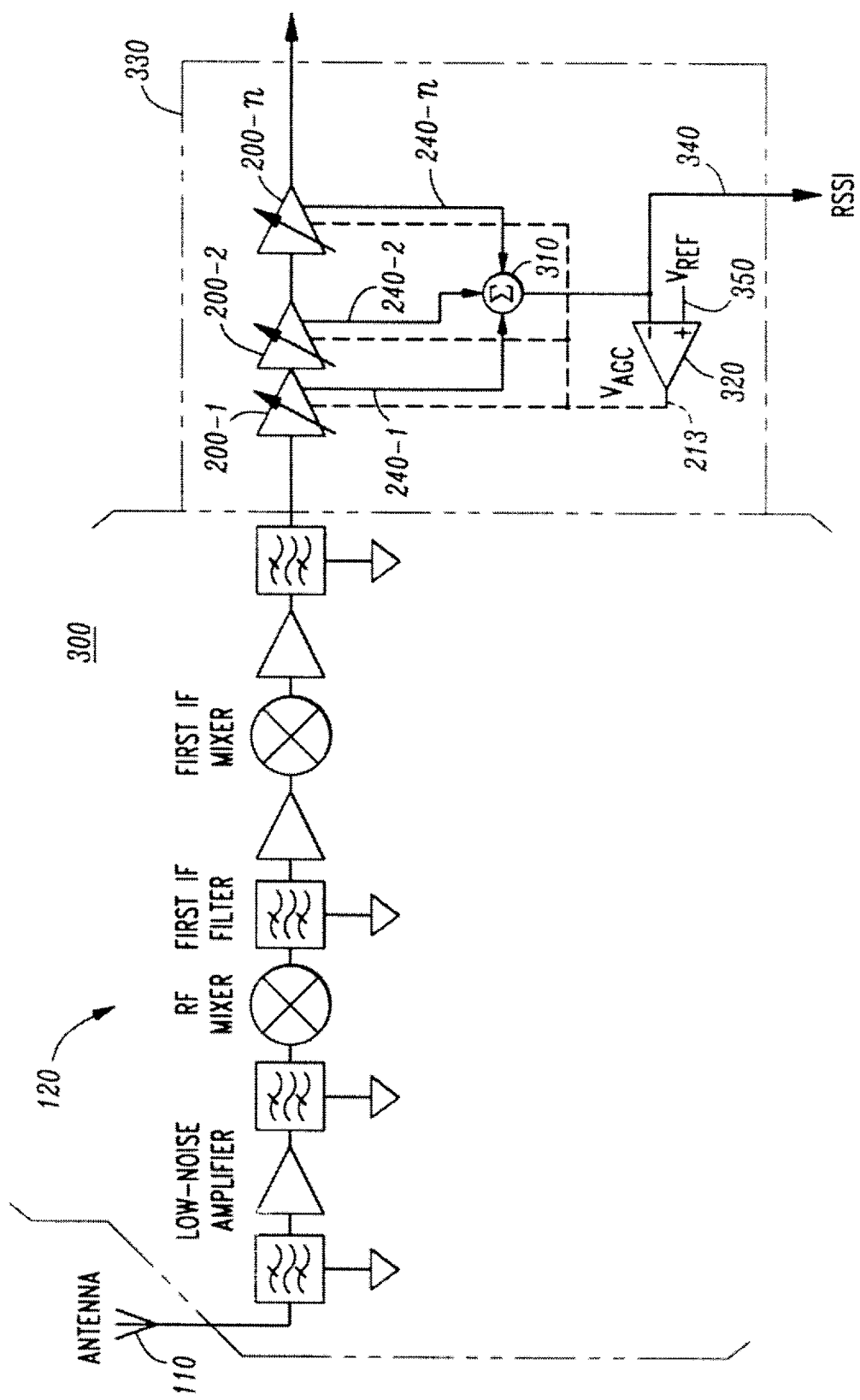
FIG. 3 illustrates a functional partial-schematic of an exemplary dual-mode mobile-station receiver that employs integrated dual-mode IF amplifier stages as disclosed by the present invention.

Turning now to FIG. 3, illustrated is a functional partial-schematic of an exemplary dual-mode mobile-station receiver 300 that employs integrated dual-mode IF amplifier stages 200 as disclosed by the present invention. The receiver 300 includes an antenna 110, antenna interface circuitry 120, and an integrated dual-mode intermediate-frequency ("IF") amplifier 330. Those skilled in the art will recognize that the antenna interface circuitry, generally designated 120, is conventional in design and may include, without limitation, preselector/duplex filters, a low-noise amplifier, a radio-frequency ("RF") mixer, a first IF filter and a first IF mixer. The principles of the present invention are not limited to a particular antenna interface architecture.

The integrated dual-mode IF amplifier 330 includes a plurality of series-coupled integrated dual-mode IF amplifier stages 200-1, 200-2, 200-n; the number of stages, n, may be selected according to overall design requirements of the mobile-station receiver 300. The integrated dual-mode IF amplifier 330 further includes a summing RSSI summing circuit 310 and a gain control circuit 320.

As described supra with respect to FIG. 2, each of the integrated dual-mode IF amplifier stages 200-1, 200-2, 200-n produces a signal 240-1, 240-2, 240-n, respectively, that is proportional to the differential input signal at each stage. The signals 240-1, 240-2, 240-n are summed by summing circuit 310 to produce a total RSSI signal 340 that is proportional to the received signal strength at antenna 110.

As also described supra with respect to FIG. 2, each of the integrated dual-mode IF amplifier stages 200-1, 200-2, 200-n is designed to operate in both a linear (digital) and a limiting (analog) mode, as controlled by an automatic-gain-control signal ("$V_{AGC}$") 213. The automatic-gain-control signal ("$V_{AGC}$") 213 is produced by gain control circuit 320, which compares the RSSI signal 340 to a reference voltage ("$V_{REF}$") 350. The reference voltage ("$V_{REF}$") 350 may be varied such that the automatic-gain-control signal ("$V_{AGC}$") 213 will cause the integrated dual-mode IF amplifier stages 200-1, 200-2, 200-n to operate in either the limiting (analog) or the linear (digital) mode, as desired. Thus, the present invention introduces an integrated dual-mode IF amplifier architecture that, for the first time, allows a single amplifier chain to amplify either analog or digital input signals and allows an accurate RSSI to be derived regardless of the type of signal being processed.

Although the present invention and its advantages have been described in detailed, those skilled in the art should understand that they can make various changes, substitutions and alterations herein without departing from the spirit and scope of the invention in its broadest form.

What is claimed is:

1. A system capable of communicating in either analog or digital wireless infrastructures comprising:

first and second amplifiers, having parallel-coupled signal inputs and gains that combine to equal a constant total value, that receive an input signal and produce therefrom first and second output signals that are each a function of an applied gain signal;

a combinatorial circuit, coupled to said first and second amplifiers, that derives from said first and second output signals a combined signal that is a function of a power of said input signal and substantially immune to changes in said applied gain signal; and a gain control circuit, coupled to said first and second amplifiers, that holds said gain signal constant when said input signal is analog to operate said common amplifier stage in a limiting mode and varies said gain signal when said input signal is digital to operate said common amplifier stage in a linear mode.

2. The system as recited in claim 1 further comprising a constant current circuit, coupled to said first and second amplifiers, that maintains a constant total current flow through said first and second amplifiers, a change in current flow through said first amplifier causing a counteracting change in current flow through said second amplifier thereby to cause said gains to combine to equal said constant total value.

3. The system as recited in claim 1 wherein said input signal is a differential signal and each of said first and second amplifiers comprises differentially-coupled, matched transistors.

4. The system as recited in claim 1 wherein said combinatorial circuit sums said first and second output signals to derive said combined signal.

5. The system as recited in claim 1 further comprising a rectifier, coupled to an output of said combinatorial circuit, that receives and rectifies said combined signal to produce therefrom a received signal strength indicator (RSSI).

6. The system as recited in claim 1 wherein said receiver comprises a plurality of series-coupled amplifier stages, each of said plurality of series-coupled amplifier stages having a counterpart of portions of said system, combined signals derived by combinatorial circuits of each of said plurality of series-coupled amplifier stages being rectified and summed to produce a received signal strength indicator (RSSI).

7. The system as recited in claim 1 further comprising a constant current circuit, coupled to said first and second amplifiers and comprising differentially-coupled transistors, that receives said applied gain signal and a reference signal and controls a total current passing through said first and second amplifiers thereby to cause said gains to combine to equal said constant total value.

8. For use in a system capable of communicating in either analog or digital wireless infrastructures, a method of allowing said system to process both analog and digital input signals in a common amplifier stage, said method comprising the steps of:

receiving an input signal into first and second amplifiers having parallel-coupled signal inputs and gains that combine to equal a constant total value, said first and second amplifiers producing first and second output signals that are each a function of an applied gain signal;

deriving from said first and second output signals a combined signal that is a function of a power of said input signal and substantially immune to changes in said applied gain signal;

holding said gain signal constant when said input signal is analog to operate said common amplifier stage in a limiting mode; and varying said gain signal when said input signal is digital to operate said common amplifier stage in a linear mode.

9. The method as recited in claim 8 further comprising the step of maintaining a constant total current flow through said first and second amplifiers, a change in current flow through said first amplifier being accompanied by a counteracting change in current flow through said second amplifier thereby to cause said gains to combine to equal said constant total value.

10. The method as recited in claim 8 wherein said input signal is a differential signal and each of said first and second amplifiers comprises differentially-coupled, matched transistors.

11. The method as recited in claim 8 wherein said step of deriving comprises the step of summing said first and second output signals to derive said combined signal.

12. The method as recited in claim 8 further comprising the step of rectifying said combined signal to produce therefrom a received signal strength indicator (RSSI).

13. The method as recited in claim 8 further comprising the steps of:

amplifying said input signal in a plurality of series-coupled amplifier stages;

rectifying combined signals derived in each of said plurality of amplifier stages to produce rectified combined signals; and summing said rectified combined signals to produce a received signal strength indicator (RSSI).

14. The method as recited in claim 8 further comprising the step of receiving said applied gain signal and a reference signal into a constant current circuit coupled to said first and second amplifiers and comprising differentially-coupled transistors, said constant current circuit controlling a total current passing through said first and second amplifiers thereby to cause said gains to combine to equal said constant total value.

15. A mobile station capable of operating in either analog or digital wireless infrastructures, comprising:

a transceiver that communicates with a base station to receive an alternative one of an analog and digital wireless signal;

at least one local oscillator that generates at least one local frequency;

at least one mixer, coupled to said transceiver and said at least one local oscillator, that applies said at least one local frequency to said wireless signal to generate therefrom an input signal;

at least one filter that receives and filters said input signal;

an intermediate frequency (IF) amplification system, having a plurality of series-coupled amplifier stages forming a common amplifier chain that allows said mobile station to process both analog and digital input signals in said common amplifier chain, each of said amplifier stages including:

first and second amplifiers, having parallel-coupled signal inputs and gains that combine to equal a constant total value, that receive an input signal and produce therefrom first and second output signals that are each a function of an applied gain signal, a combinatorial circuit, coupled to said first and second amplifiers, that derives from said first and second output signals a combined signal that is a function of a power of said input signal and substantially immune to changes in said applied gain signal, and a gain control circuit, coupled to said first and second amplifiers, that holds said gain signal constant when said input signal is analog to operate said each of said common amplifier stages in a limiting mode and varies said gain signal when said input signal is digital to operate said each of said common amplifier stages in a linear mode.

16. The mobile station as recited in claim 15 wherein said each of said plurality of amplifier stages further comprises a constant current circuit, coupled to said first and second amplifiers, that maintains a constant total current flow through said first and second amplifiers, a change in current flow through said first amplifier being accompanied by a counteracting change in current flow through said second amplifier thereby to cause said gains to combine to equal said constant total value.

17. The mobile station as recited in claim 15 wherein said input signal is a differential signal and each of said first and second amplifiers comprises differentially-coupled, matched transistors.

18. The mobile station as recited in claim 15 wherein said combinatorial circuit sums said first and second output signals to derive said combined signal.

19. The mobile station as recited in claim 15 wherein said each of said plurality of amplifier stages further comprises a rectifier, coupled to an output of said combinatorial circuit, that receives and rectifies said combined signal to produce therefrom a received signal strength indicator (RSSI).

20. The mobile station as recited in claim 15 wherein said each of said plurality of amplifier stages further comprises a constant current circuit, coupled to said first and second amplifiers and comprising differentially-coupled transistors, that receives said applied gain signal and a reference signal and controls a total current passing through said first and second amplifiers thereby to cause said gains to combine to equal said constant total value.

* * * * *